UNITED STATES PATENT OFFICE.

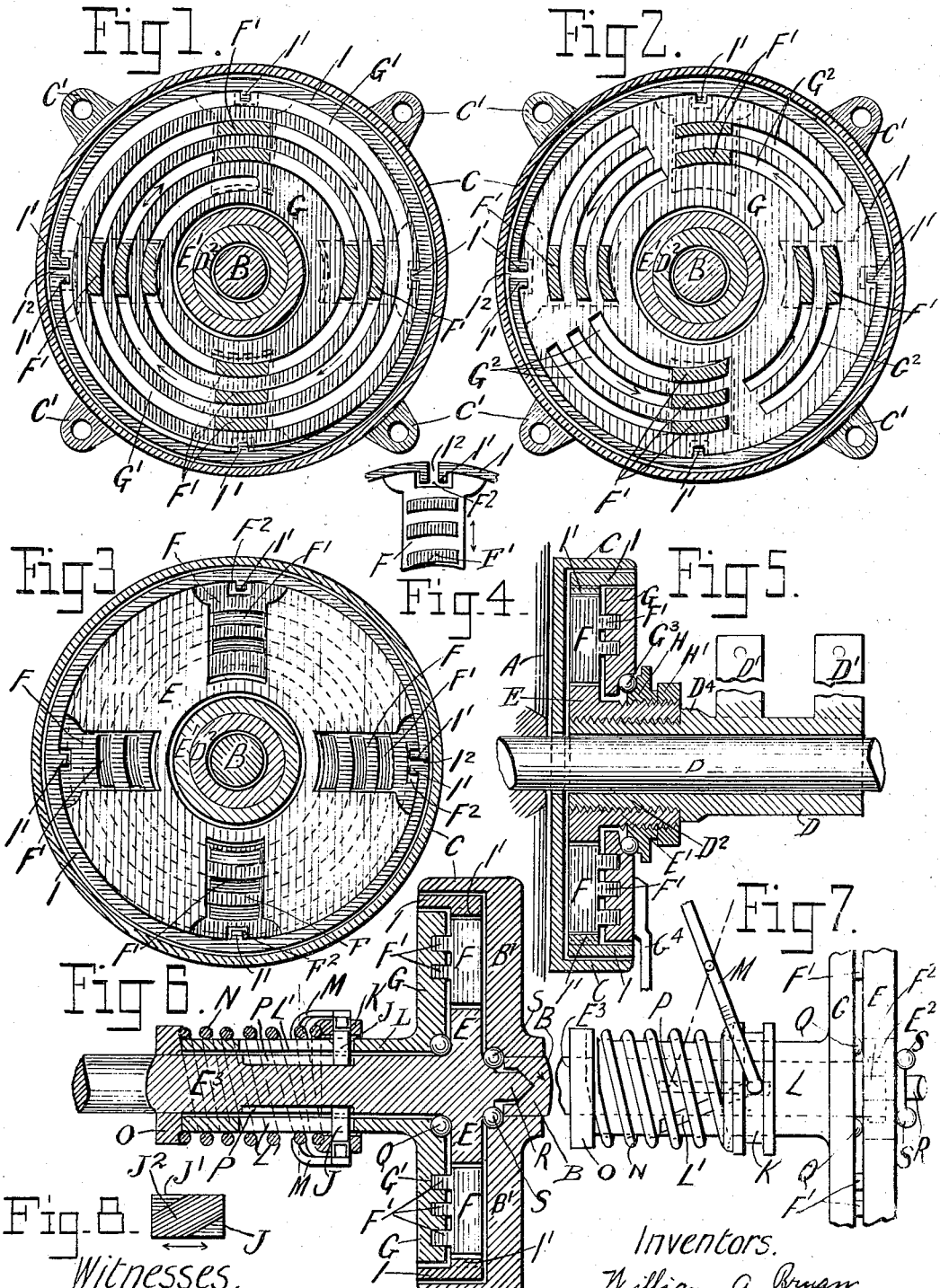

WILLIAM GEORGE BRYAN AND PERCIVAL BERNARD SHEATHER, OF SYDNEY, NEW SOUTH WALES, AUSTRALIA.

MECHANICALLY-OPERATED BRAKE.

1,121,794.       Specification of Letters Patent.     Patented Dec. 22, 1914.

Application filed February 3, 1913. Serial No. 745,911.

*To all whom it may concern:*

Be it known that we, WILLIAM GEORGE BRYAN and PERCIVAL BERNARD SHEATHER, citizens of the Commonwealth of Australia, residing at Sydney, New South Wales, in the Commonwealth of Australia, have jointly invented new and useful Improvements in Mechanically-Operated Brakes, of which the following is a specification.

The object of this invention is to provide an effective expanding brake and clutch appliance, by combining upon an axle, shaft, or spindle two circular disks having reciprocally operating parts. They are peripherally incased with a band or ring which is either attached to or forms an integral part of say, a motor car driving wheel, engine fly wheel, pulley, or other device to which the invention may be applied. One disk, designated the actuator, has formed on its face either a continuous convolute channel, or segments of such, into which are inserted the projecting parts of radially moving slides incased in the companion disk. In conjunction with the radial slides, a self-releasing split spring ring is used, having horns fitting into the recessed ends of the slides. When pressure is applied to the slides by rotating the actuator disk, the spring ring is expanded against the inner surface of the incasing band, and thus serves the purpose of either a brake or clutch.

Referring to the accompanying drawings, which form part of this specification: Figure 1 is an elevation of the actuator disk, showing continuous convolute channel with slide projecting parts thereon, also a split spring ring within an incasing band, the latter shown in section. Fig. 2 is a similar view to Fig. 1 of the actuator disk, but with segmental convolute channels in lieu of a continuous channel, arranged for operating in a reverse direction to Fig. 1. Fig. 3 is an elevation of the companion disk, having radial slides associated with the split spring ring within an incasing band. Fig. 4 is an elevation of a radial slide, and portion of the split spring ring with horns in gapped part. Fig. 5 is a central, longitudinal sectional elevation, showing the invention adapted to serve as a brake to the driving wheel of a motor car or such like. Fig. 6 is a central, longitudinal, sectional elevation, showing the invention adapted to serve as an expanding clutch for transmitting motion. The actuator disk with slanting grooves in sleeve, is shown associated with its companion slide carrying disk attached to spindle. The spring ring and incasing band are also shown. Fig. 7 is a plan of Fig. 6, showing the actuator disk and slide carrier disks partly broken away, but with fixed spring seating collar, spring, grooved sliding collar, forked actuating lever, also slanting channel in sleeve of actuator disk, and longitudinal groove (dotted) in shaft. Fig. 8 is a detail of a sliding collar fitting piece, having slanting and longitudinal parts to fit in their respective grooves.

When utilizing the invention as a wheel brake, the wheel A, secured to the driving axle or shaft B, has the band C fastened to it with lugs $C^1$. It serves to incase the reciprocally operating parts of the slide carrier disk E and actuator disk G. The sleeve or tubular part D, in which the axle freely revolves, is rigidly attached to a convenient part of the under carriage by parts $D^1$. Upon the male screw threaded end $D^2$, boss $E^1$, forming part of the slide carrier disk E, is secured against the security collar $D^4$. Any suitable number of radial slide channels $E^2$ (dotted in Fig. 7) are formed to receive the slides F, whose projecting parts $F^1$ are fitted into either the continuous convolute channel $G^1$, Fig. 1, or the segmental convolute channels $G^2$, Fig. 2, sunk in actuator disk G, which is maintained in its correct central position by the bearing balls $G^3$, screw threaded cone H, and back nut $H^1$, on the boss $E^1$. These bearings also facilitate the rotary motion of the disk when pressure is applied to lever $G^4$ for the purpose of putting on the brake.

The split spring ring I is supported with its contact surface circumferentially equidistant from band C upon the slides F, the horns $I^1$ fitting into the gaps $F^2$ to keep the ring stationary, and to prevent it from revolving when the slides are pressed against it to expand it.

To render the ring I self releasing, it is made of a tapering thickness disposed equally for half its circumference from either side of the split formation, and is expanded by inserting a block piece in the split $I^2$ to increase the diameter before turning the outer or contact surface. Upon removal of the block piece the ring will again automatically assume the desired position when pressure is withdrawn from slides F.

When utilizing the invention as a clutch appliance, as, for instance, when it is desired to couple up two pieces of shafting, one of which is associated with the prime mover, the same reciprocally operating parts are used, in the form shown in Figs. 6 and 7. The driving shaft B, with fly wheel $B^1$, would be associated with the prime mover, but band C on fly wheel will become the transmitter or driver when split spring ring I is in contact therewith, such contact being obtained by the rotary movement of actuator disk G and the radial movements of slides F. The primary turning of disk G is accomplished by means of fitting pieces J attached to the grooved collar K. The latter is caused to slide upon the sleeve L, which is part of disk G, by manipulating the forked lever M. The spring N, confined between collars K and O, serves to retain collar K in the home position, as shown, for producing contact of split spring ring I with band C. The fitting pieces are dual shaped, the parallel part $J^1$ being placed in the longitudinal channel P formed in the second shaft $E^3$ to which slide carrier disk E is attached. The upper diagonal part $J^2$ is placed in the slanting channel $L^1$. In Fig. 7 the relative positions of the longitudinal and diagonal channels are shown.

As shaft $E^3$ is normally stationary, and sleeve L is to be rotated thereon within certain limitations, the bearing balls Q are used to facilitate motion and to prevent friction between the surfaces of the disks E and G. Hence, when the fitting pieces J are moved along their respective channels, the part $J^2$ in channel $L^1$ will cause disk G to rotate and impart the necessary radial motion to slides F. Then ring I, being forced against band C, the resultant friction insures motion being imparted by the driving power.

To insure the accurate adjustment of the shafts B and $E^3$ in line, the pointed end R on $E^3$ is fitted into a correspondingly shaped recess in shaft B, and to minimize friction at that part, bearing balls S are used.

Having now described our invention, what we claim as new and desire to secure by Letters Patent is:—

1. A fixed radially channeled disk, in combination with slides movable in said channels having recesses in their outer ends and provided with projecting parts, a rotatable actuating disk provided with a convolute channel engaging said projecting parts, a circular band surrounding the first mentioned disk and an intervening split spring ring provided with horns which enter said recesses, said slides being adapted to be forced outward against said ring, for binding the latter against said band.

2. A fixed radially channeled disk, in combination with slides movable in said channels having recesses in their outer ends and provided with projecting parts, a rotatable actuating disk provided with a convolute channel engaging said projecting parts, a circular band surrounding the first mentioned disk and an intervening split spring ring provided with horns which enter said recesses and having its two halves reversely tapered to its ends, the said slides being adapted to be forced outward against said ring for binding the latter against said band.

3. A fixed radially channeled disk, in combination with slides moving in said channels and provided with projecting parts, a rotatable actuating disk channeled in convolutions engaging said projecting parts, a circular band surrounding the above mentioned disk and an intervening split spring ring provided with means for holding it in place and consisting of its two parts reversely tapered to the ends from a point opposite the split in the ring, the said slides being adapted to be forced outward against said ring for binding the latter against said band.

In testimony whereof we have signed our names to this specification in the presence of two subscribing witnesses.

WILLIAM GEORGE BRYAN.
PERCIVAL BERNARD SHEATHER.

Witnesses:
HARRY A. SMEDLEY,
H. C. CAMPBELL.